(12) United States Patent
Shih-Chung et al.

(10) Patent No.: US 6,653,919 B2
(45) Date of Patent: Nov. 25, 2003

(54) MAGNETIC CLOSURE APPARATUS FOR PORTABLE COMPUTERS

(75) Inventors: Hsu Shih-Chung, Taipei Hsien (TW); Yen Chia-Liang, Taipei Hsien (TW); Tseng Hua-Chung, Taipei Hsien (TW); Chu-Hsian Chian, Taipei Hsien (TW)

(73) Assignees: Wistron Corp, Taipei Hsien (TW); Acer Incorp., Taipei Hsien (TW)

( * ) Notice: Subject to any disclaimer, the term of this patent is extended or adjusted under 35 U.S.C. 154(b) by 134 days.

(21) Appl. No.: 09/940,891

(22) Filed: Aug. 29, 2001

(65) Prior Publication Data

US 2002/0105401 A1 Aug. 8, 2002

(30) Foreign Application Priority Data

Feb. 2, 2001 (TW) ........................................ 90102243 A (51) Int. Cl.[7] ................................................. H01H 9/00
(52) U.S. Cl. ......................... 335/207; 335/205; 24/303
(58) Field of Search ............................ 335/205, 206, 335/207; 24/303

(56) References Cited

U.S. PATENT DOCUMENTS

| | | | | |
|---|---|---|---|---|
| D336,077 S | * | 6/1993 | Barry et al. | D14/316 |
| 5,559,670 A | * | 9/1996 | Flint et al. | 361/681 |
| 5,664,298 A | * | 9/1997 | Nessar-Ivanovic | 24/303 |
| 5,844,543 A | * | 12/1998 | Tamura et al. | 345/156 |
| 6,201,688 B1 | * | 3/2001 | Leman | 361/681 |
| 6,215,381 B1 | * | 4/2001 | Aoki | 335/207 |

* cited by examiner

Primary Examiner—Elvin Enad
Assistant Examiner—Bernard Rojas
(74) Attorney, Agent, or Firm—Bacon & Thomas, PLLC (57) ABSTRACT

A magnetic closure apparatus for portable computers that utilizes magnetic attraction and repulsion to allow users to open and close the first housing member and second housing member of said portable computer. The first housing member has a computer and a magnetic member disposed at its inward edge. The second housing member has a magnetic apparatus, which comprises a magnetic member disposed at its inward edge corresponding to the position of the magnetic member disposed on the second housing member and a sliding member which interlinks with the magnetic member. The polarity of the magnetic field of the magnetic member disposed on the second housing member is the opposite of the polarity of the magnetic field of the corresponding magnetic member disposed at the first housing member. Moving the sliding member enables the movement of the dual layer magnetic member, thereby allowing the closure and opening of the first housing member and second housing member.

22 Claims, 10 Drawing Sheets

MAGNETIC CLOSURE APPARATUS FOR PORTABLE COMPUTERS

REFERENCE TO RELATED APPLICATIONS

The present application claims priority to Taiwan application no. 090102243 Entitled "Magnetic closure apparatus for portable computers" filed on Feb. 2, 2001.

BACKGROUND OF THE INVENTION

1. Field of the Invention

This invention generally relates to a closure apparatus for portable computers, and in particular to a magnetic closure apparatus for portable computers. With magnetic attraction and repulsion force, the present invention allows users to lock (referring to a portable computer in a closed position) and unlock (referring to a portable computer in an open position) their portable computer. Moreover, it is also applicable to portable computers with 180-degree reversible top housing.

2. Description of the Related Art

Figure 1:
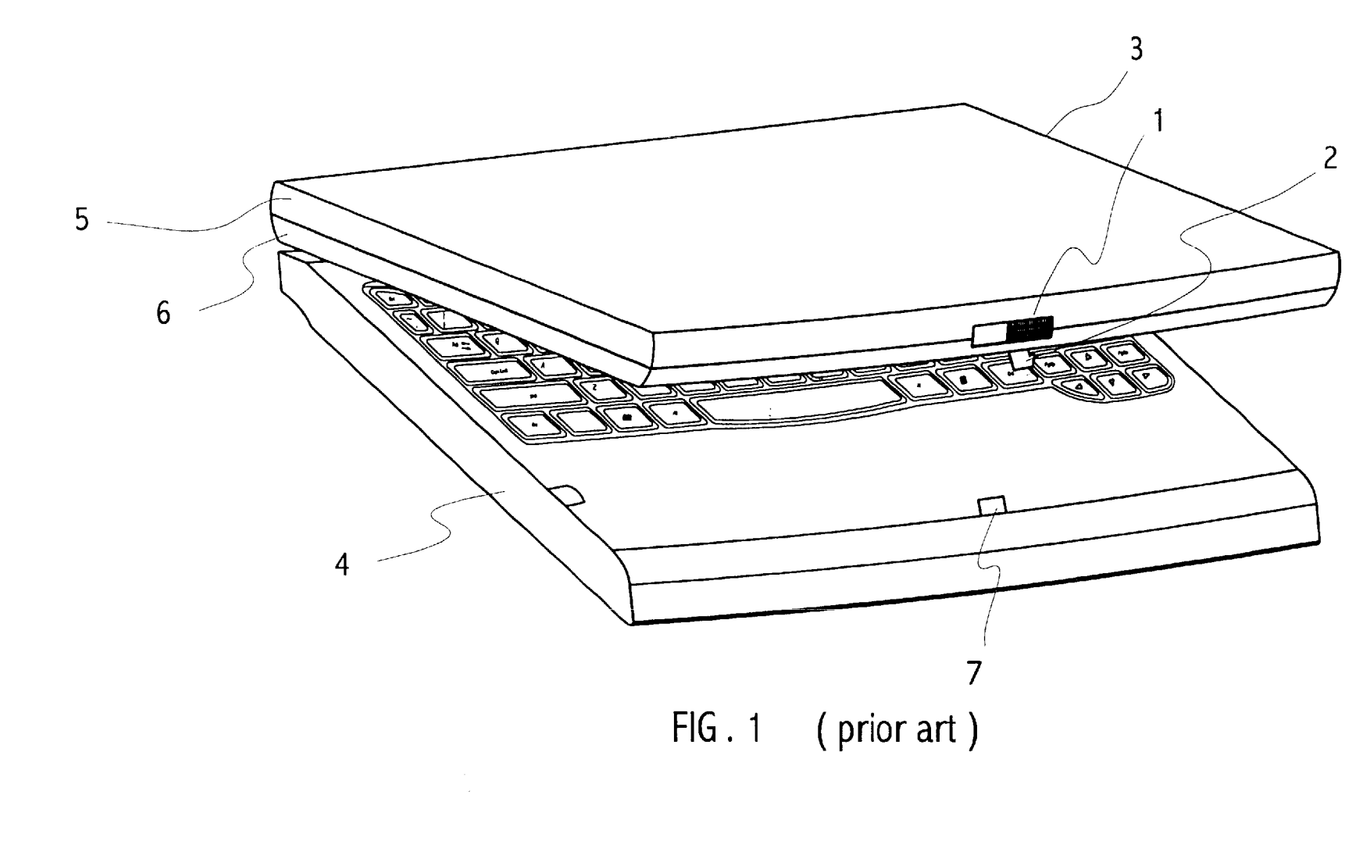
FIG. 1 is a perspective view of a prior art mechanical latch for a portable computer.

Mechanical latches are commonly applied among portable electronic devices such as notebook computers, electronic dictionaries, PDAs (personal digital assistants), electronic books, and PDA based stock reporters, to allow users to lock and unlock portable devices comprising two parts; the display or top housing and the base housing or the computer system. Referring to FIG. 1, a perspective view of a prior art mechanical latch for a portable computer is illustrated. When latch hook 2 and latch hole 7 are latched, the first housing member 4 and second housing member 3 are in a closed position, as shown in FIG. 1. Using latch 1 enables users to disengage the closed position between latch hook 2 and latch hole 7. Users grasp the second housing member 3 and lift it upwardly to direct it to the open position.

Considerable progress has been made in portable computer applications and designs in recent years, which have in turn presented computer engineers with new challenges. As such, conventional designs such as mechanical latches have come to seem inadequate relative to the latest portable computer applications. For example, a mechanical latch is unable to lock and unlock a portable computer when it has a 180-degree reversible second housing member. Because a mechanical latch involves engaging the latch hook and latch hole to close a portable computer, the addition of a second housing member to a portable computer with a 180-degree reverse, means that a conventional mechanical latch cannot be used. This is true because after reversal the portable computer panel 5 faces down and the portable computer bezel 6 faces up. In such a situation the latch hook on the front side on the second housing member and latch hole on the first housing member are placed in a back to back position, making the engagement of the latch hook and latch hole unworkable. Accordingly, the portable computer cannot be closed properly.

When the prior art mechanical latch is engaged, in a closed position, it leaves a small gap between first housing member 4 and second housing member 3, which creates an aesthetically unpleasing appearance. In addition, when the portable computer is in an open position, latch hook 2 is exposed and may potentially damage the portable computer by tangling with other objects or wires around the work area.

SUMMARY OF THE INVENTION

The object of the present invention is to provide a magnetic closure apparatus for portable computers used to bring the first housing member and second housing member of a portable computer to a closed position. By moving the sliding member on the second housing member, the magnetic member on the second housing member is moved, generating a relative displacement between the magnetic members on the first and the second housing members. As a result, the magnetic attraction and repulsion between the two sliding members can be used to bring the first housing member and second housing member to closed and open positions respectively.

Another object of the present invention is to provide a magnetic closure apparatus for portable computers, which is also applicable to a portable computer with a 180-degree reversible second housing member. By moving the sliding member on the second housing member, the magnetic member on the second housing member is moved and generates a relative displacement between the magnetic member on the first and second housing members. As a result, the magnetic attraction and repulsion between the two sliding members can be used to bring the first housing member and second housing member to closed and open positions respectively.

Still another object of the present invention is to provide portable computers with a magnetic closure apparatus to ensure the first housing member and the second housing member of the portable computer are firmly closed, whilst at the same time avoiding potential damage resulting from accidents caused by an exposed latch hook tangling with objects or wires in the work area.

BRIEF DESCRIPTION OF THE DRAWINGS

The following detailed description, which is given by way of example, and not intended to limit the invention to the embodiments described herein, can best be understood in conjunction with the accompanying drawings, in which.

DETAILED DESCRIPTION OF THE INVENTION

Figure 2:
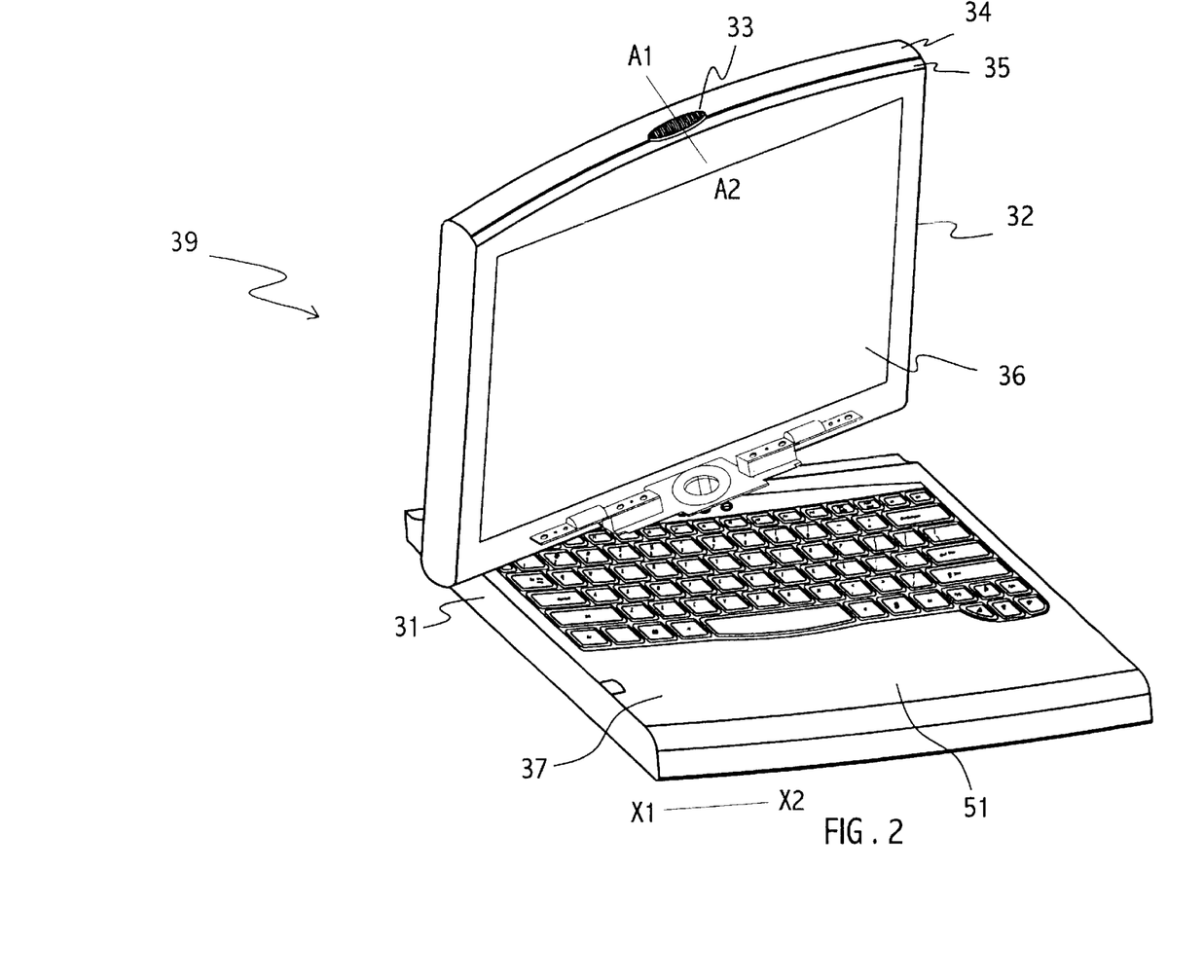
FIG. 2 is a perspective view of the magnetic closure apparatus for a portable computer in accordance with the first preferred embodiment of the present invention.

First Preferred Embodiment:

FIG. 2 illustrates a magnetic closure apparatus used in a portable electronic device such as notebook computer, electronic dictionary, PDA, electronic book or PDA based stock reporter in accordance with the present invention. Utilizing the magnetic attractive and repulsive force between different magnetic poles, the present invention allows users to control the position of the first and second housing members of a portable computer.

The magnetic closure apparatus for a portable computer comprises a first housing member 31 and a second housing member 32, wherein the first housing member 31 has a computer system 37 and a first single layer magnetic member 51. The second housing member 32 has a magnetic apparatus 33 including a dual layer magnetic member 52, a sliding member 38 linked with the dual layer magnetic member 52, and an LCD (liquid crystal display) module 39, having a LCD 36, a panel 34 and a bezel 35.

Figure 3:
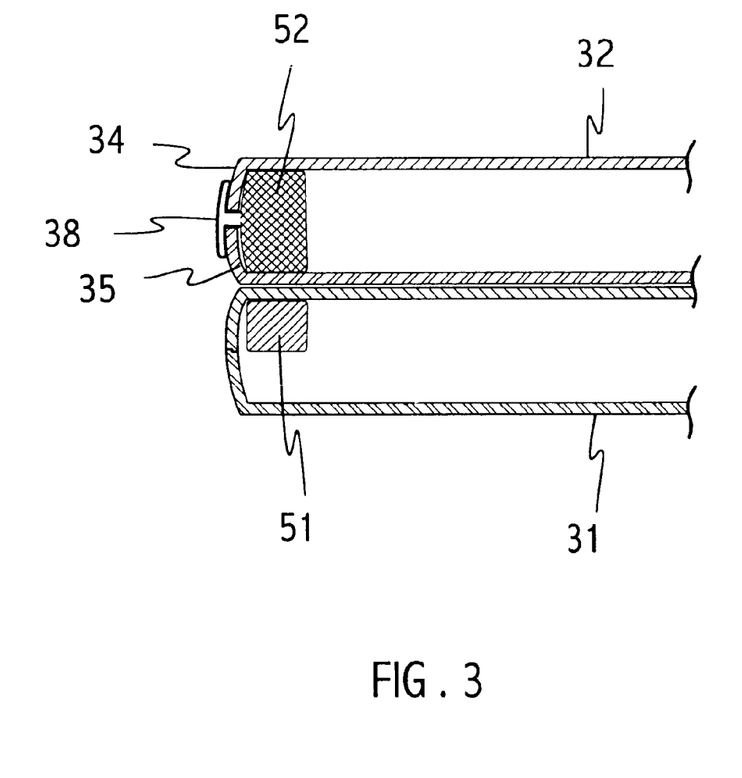
FIG. 3 illustrates a magnified cross section view of the magnetic closure apparatus for a portable computer taken along lines A1–A2 in the FIG. 2 in accordance with the first preferred embodiment.

FIG. 3 illustrates a magnified cross section view of the magnetic closure apparatus for a portable computer taken along lines A1–A2 in the FIG. 2. The magnetic apparatus 33 further comprises a dual layer magnetic member 52 disposed at the inward edge on the second housing member 32 between the panel 34 and bezel 35 and a sliding member 38 disposed at the edge portion on the second housing member 32, linked with the dual layer magnetic member 52. Further, the first single layer magnetic member 51 is disposed at the inward edge of the first housing member 31 which corresponds to the position of the dual layer magnetic member 52 on the second housing member 32.

Figure 4:
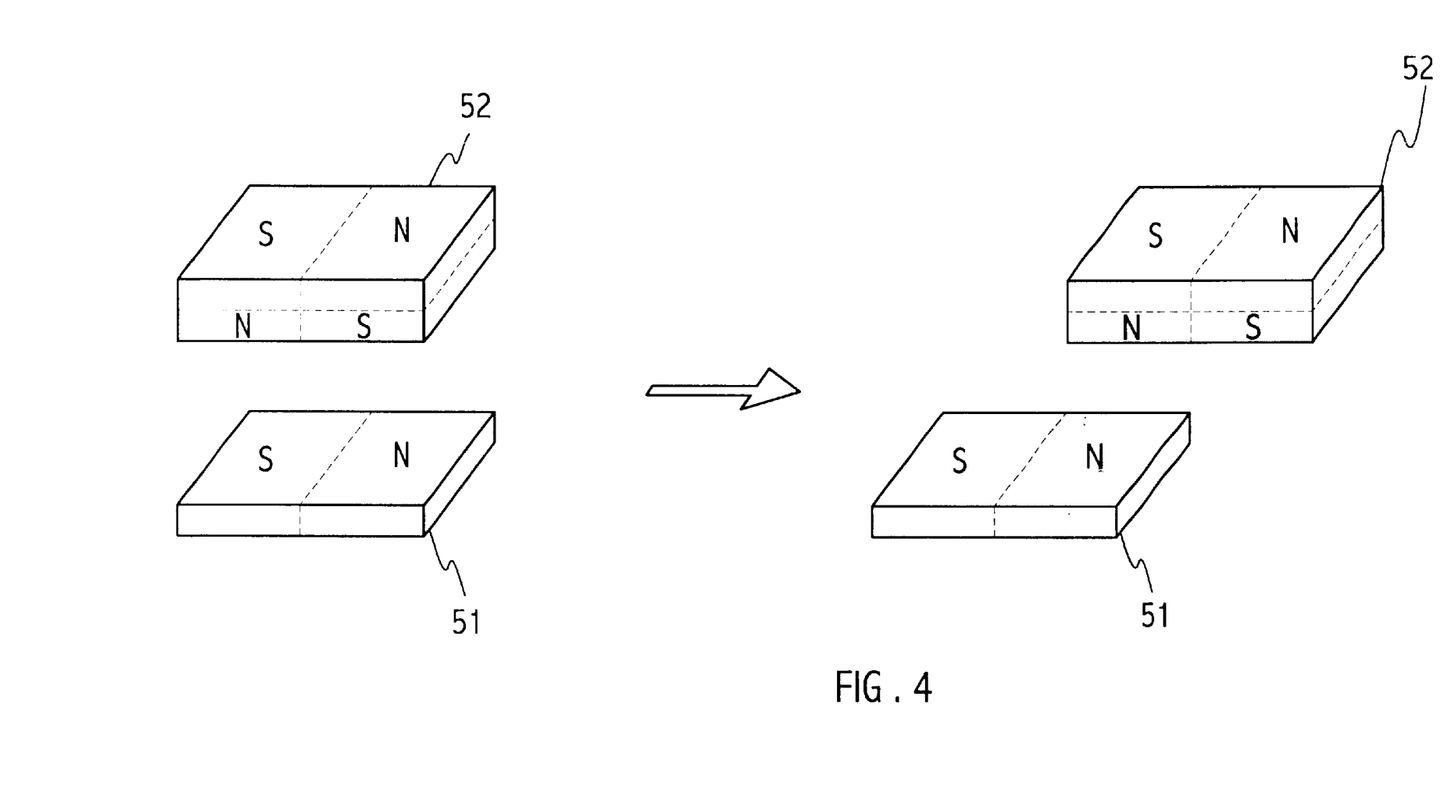
FIG. 4 is a simplified diagram of the movement between the dual layer magnetic member and the first single layer magnetic member of the magnetic closure apparatus parallel to lines X1–X2 in the FIG. 2 in accordance with the first preferred embodiment.

FIG. 4 is a simplified diagram of the movement between the dual layer magnetic member and the first single layer magnetic member of the magnetic closure apparatus parallel to lines X1–X2 in FIG. 2. Magnetic field polarity in the dual layer magnetic member 52 in FIG. 4 is opposite. The polarity of the first single layer magnetic member 51 magnetic field is the opposite of the polarity of the bottom layer of the dual layer magnetic member 52. As shown in the left of FIG. 4, the dual layer magnetic member 52 above, and the first single layer magnetic member 51 beneath, attract each other as a result of magnetic attraction, therefore the portable computer is in the closed position. However, if users wish to disengage the closed position and direct the portable computer to an open position by sliding the sliding member 38 which is linked to the dual layer magnetic member 52, a relative position displacement then is caused between the dual layer magnetic member 52 and the firs single layer magnetic member 51. It follows that the magnetic force between the dual layer magnetic member 52 and the first single layer magnetic member 51 then transforms from attraction to repulsion as shown at the right of FIG. 4. Consequentially, the portable computer is moved to an open position. In brief, by sliding the sliding member 38 and generating position displacement between the second housing member 32 and first housing member 31, users are able to determine whether their portable computer is in a closed or opened position.

Additionally, when the second housing of a portable computer is reversible, a 180-degree reverse on the second housing member causes the panel on the second housing member to face upwards. Because the magnet disposed at the second housing member is dual-layered, the position between dual layer magnetic member 52 and the facing first single layer magnetic member 51, with respect to the magnetic field, remains the same as prior to the reverse. This means that the first single layer magnetic member 51 and the dual layer magnetic member 52 still attract each other as shown on the left of FIG. 4. In this way, the method used to control the position of portable computer members is not changed. With this method users move the sliding member, which then enables movement of the dual layer magnetic member 52 using magnetic attraction and repulsion, to allow opening and closure between the first housing member 51 and the second housing member 52.

Figure 5:
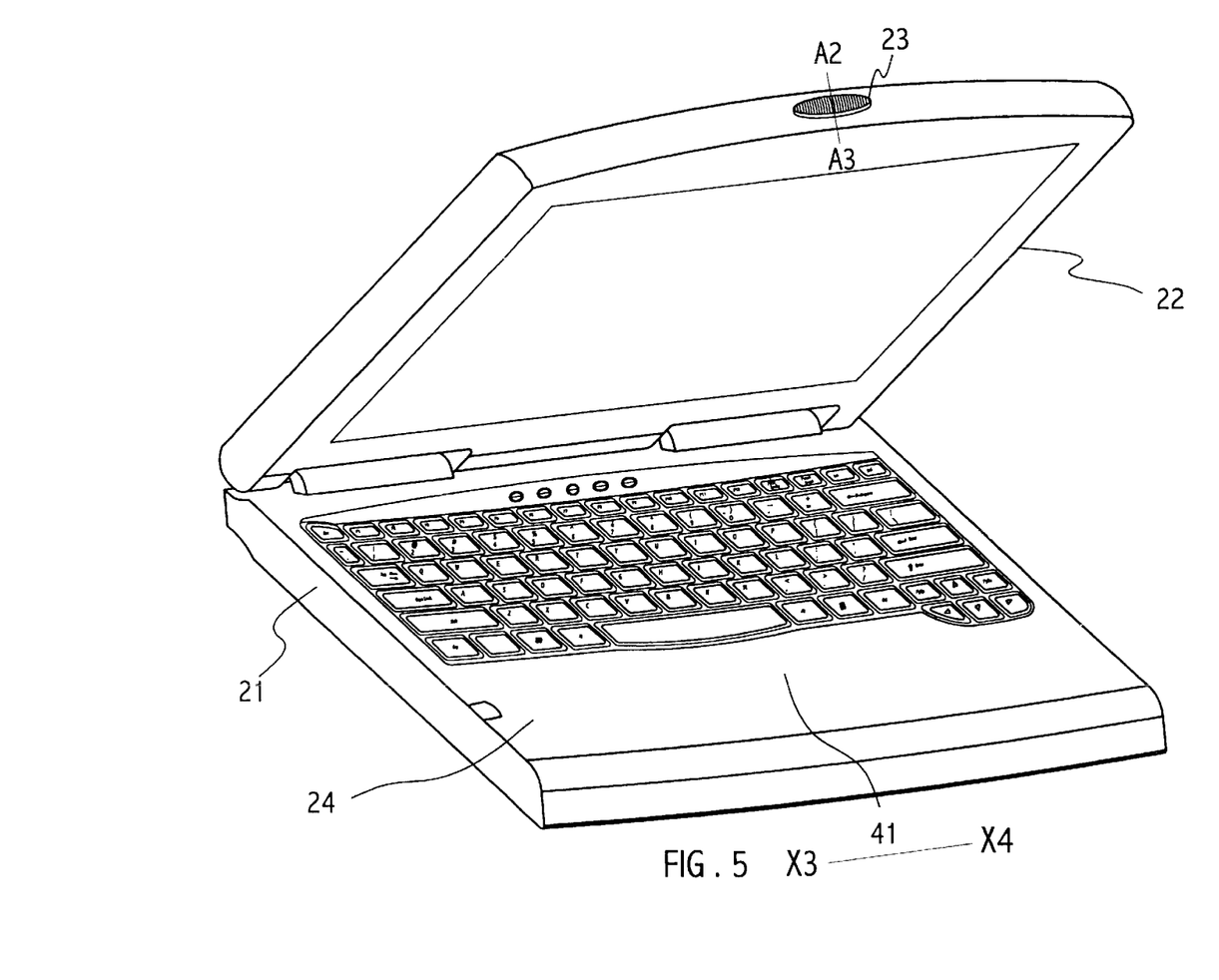
FIG. 5 is a perspective view of the magnetic closure apparatus for a portable computer in accordance with the second preferred embodiment of the present invention.

Second Preferred Embodiment:

FIG. 5 illustrates a magnetic closure apparatus used in portable electronic devices such as notebook computers, electronic dictionaries, PDA, electronic books and PDA based stock reporters, in accordance with the present invention. Utilizing the magnetic attraction and repulsion between different magnetic poles, the present invention allows users to control the position of the first housing member and second housing member of a portable computer.

The magnetic closure apparatus for a portable computer comprises a first housing member 21 and a second housing member 22, wherein the first housing member 21 has a computer system 24 and a second single layer magnetic member 41. The second housing member 22 has a magnetic apparatus 23 including a third single layer magnetic member 42, and a sliding member 28, linked with the third single layer magnetic member 42.

Figure 6:
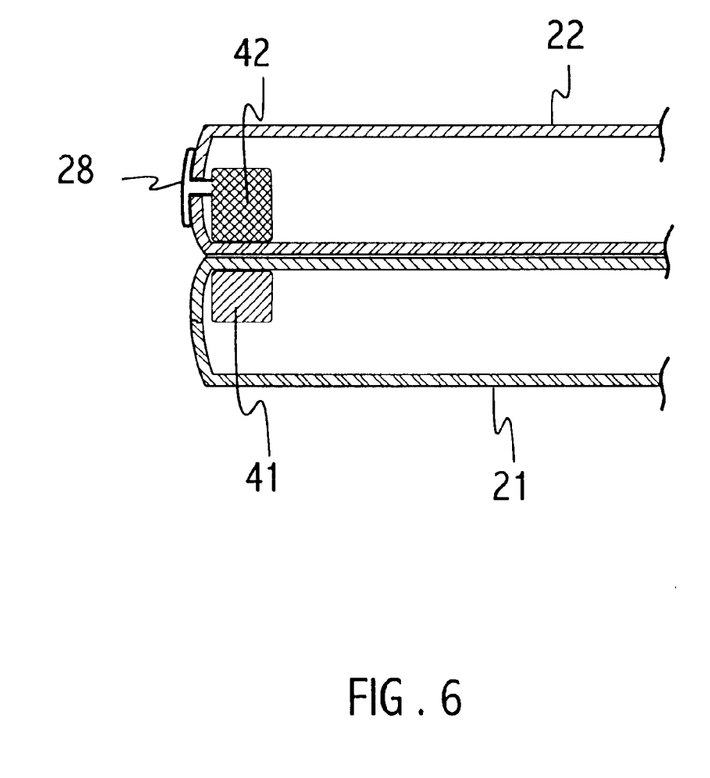
FIG. 6 illustrates a magnified cross section view of the magnetic closure apparatus for a portable computer taken along lines A3–A4 in the FIG. 5 in accordance with the second preferred embodiment.

FIG. 6 illustrates a magnified cross section view of the magnetic closure apparatus for a portable computer taken along lines A3–A4 in the FIG. 5. Referring to FIG. 6, the magnetic apparatus 23 further comprises a third single layer magnetic member 42 disposed at the inward edge on the second housing member 22 and a sliding member 28 disposed at the edge portion on the second housing member 22, linked with the a third single layer magnetic member 42. Further, the second single layer magnetic member 41 is disposed at the inward edge of the first housing member 21 which corresponds to the position of the third single layer magnetic member 42 on the second housing member 22.

Figure 7:
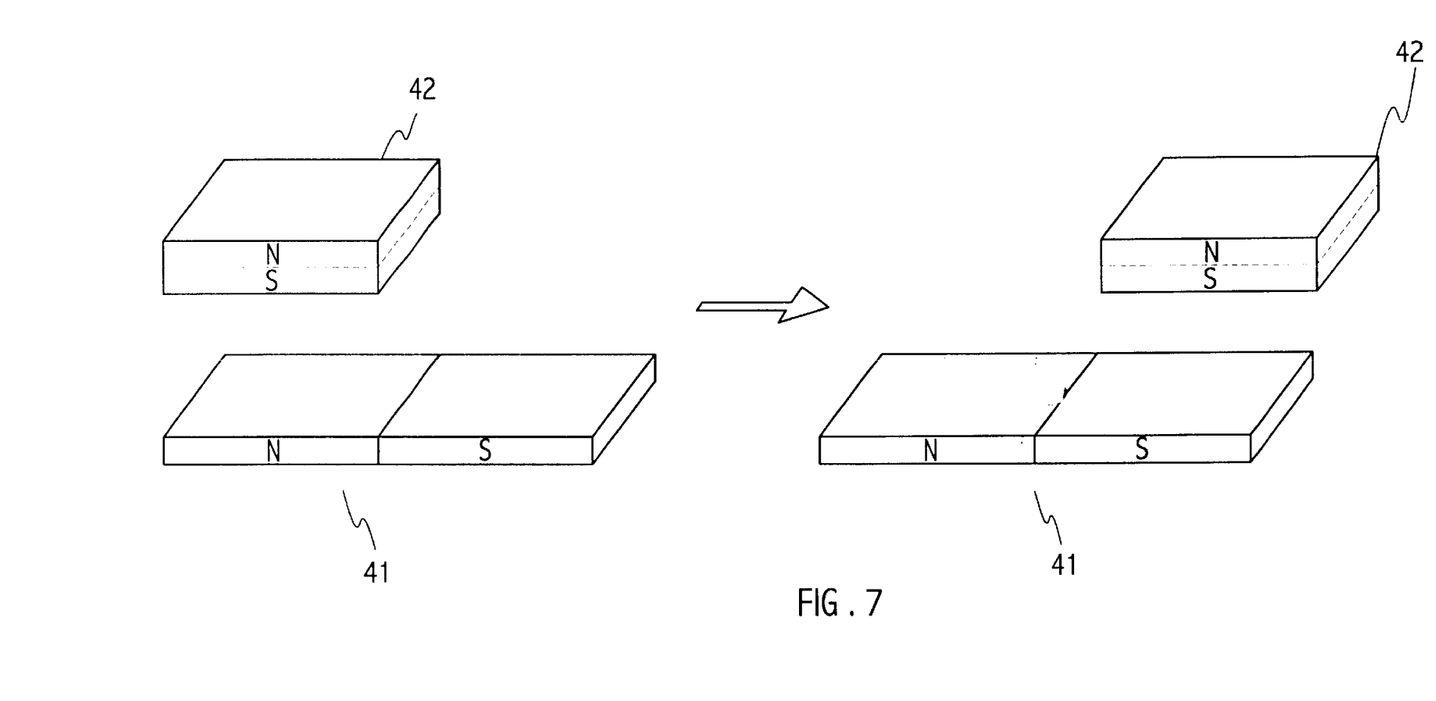
FIG. 7 is a simplified diagram of the movement between the second single layer magnetic member and the third single layer magnetic member of the magnetic closure apparatus parallel to lines X3–X4 in the FIG. 5 in accordance with the second preferred embodiment.

FIG. 7 is a simplified diagram of the movement between the second single layer magnetic member and the third single layer magnetic member of the magnetic closure apparatus parallel to lines X3–X4 in the FIG. 5. In FIG. 7, the second single layer magnetic member 41 is illustrated. The polarity of the third single layer magnetic member 42 magnetic field is the opposite of that for the second single layer magnetic member 41. As shown on the left of FIG. 4, the second single layer magnetic member 41 beneath, and the third single layer magnetic member 42 above, attract each other as a result of magnetic attraction, therefore the portable computer is in a closed position.

However, if users wish to disengage the closed position and direct the portable computer to an open position, they can do this by moving the sliding member 28, which is linked to the third single layer magnetic member 42. A relative position displacement is then formed between the third single layer magnetic member 42 and the second single layer magnetic member 41. It follows that the magnetic force between the third single layer magnetic member 42 and the second single magnetic member 41 then transforms from attraction to repulsion as shown at the right of FIG. 4. Consequentially, the portable computer is in an open position. In brief, by moving the sliding member 28 and generating position displacement between the second housing member 22 and first housing member 21, users are able to control whether their portable computer is in an open or closed position.

Figure 8:
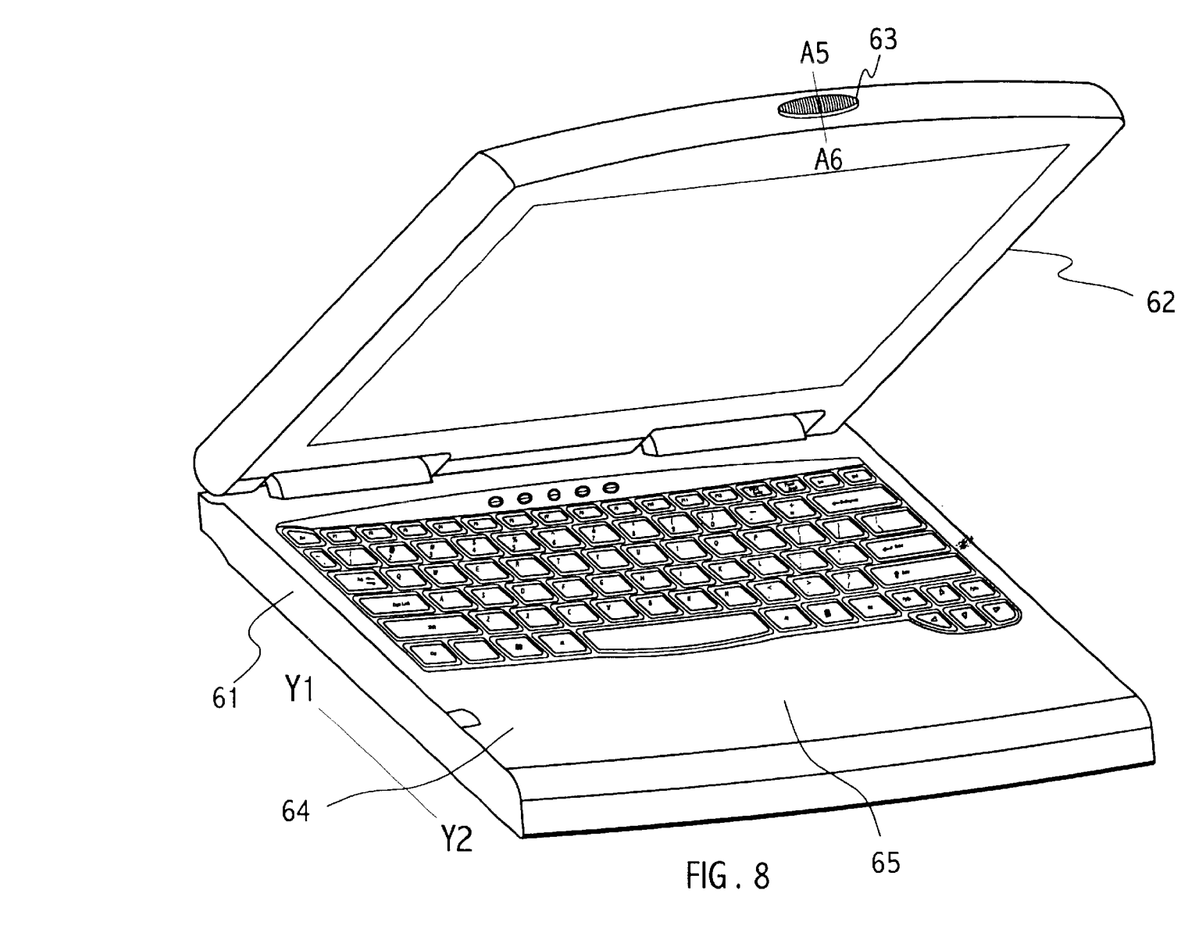
FIG. 8 is a perspective view of the magnetic closure apparatus for a portable computer in accordance with the third preferred embodiment of the present invention.

Third Preferred Embodiment:

FIG. 8 illustrates a magnetic closure apparatus used in portable electronic devices such as notebook computers, electronic dictionaries, PDA, electronic books and PDA based stock reporters, in accordance with the present invention. Utilizing the magnetic attraction and repulsion between different magnetic poles, the present invention allows users to control the position of the first housing member and second housing member of a portable computer.

The magnetic closure apparatus for a portable computer comprises a first housing member 61 and a second housing member 62, wherein the first housing member 61 has a computer system 64 and a fourth single layer magnetic member 65. The second housing member 62 has a magnetic apparatus 63, including a fifth single layer magnetic member 66, and a sliding member 68, linked with the fifth single layer magnetic member 66.

Figure 9:
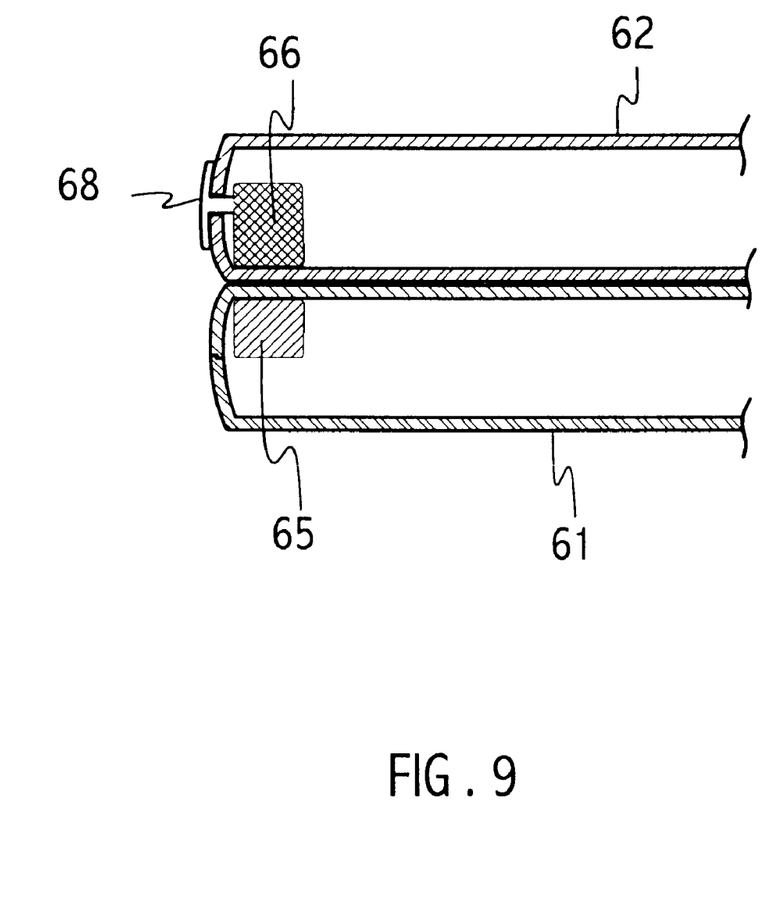
FIG. 9 illustrates a magnified cross section view of the magnetic closure apparatus for a portable computer taken along lines A5–A6 in the FIG. 8 in accordance with the third preferred embodiment.

FIG. 9 illustrates a magnified cross section view of the magnetic closure apparatus for a portable computer taken along lines A5–A6 in FIG. 8. Referring to FIG. 9, the magnetic apparatus 63 further comprises a fifth single layer magnetic member 66 disposed at the inward edge on the second housing member 62 and a sliding member 68 disposed at the edge portion on the second housing member 62 linked with the a fifth single layer magnetic member 66. Further, the fourth single layer magnetic member 65 is disposed at the inward edge of the first housing member 61 which corresponds to the position of the a fifth single layer magnetic member 66 on the second housing member 62.

Figure 10:
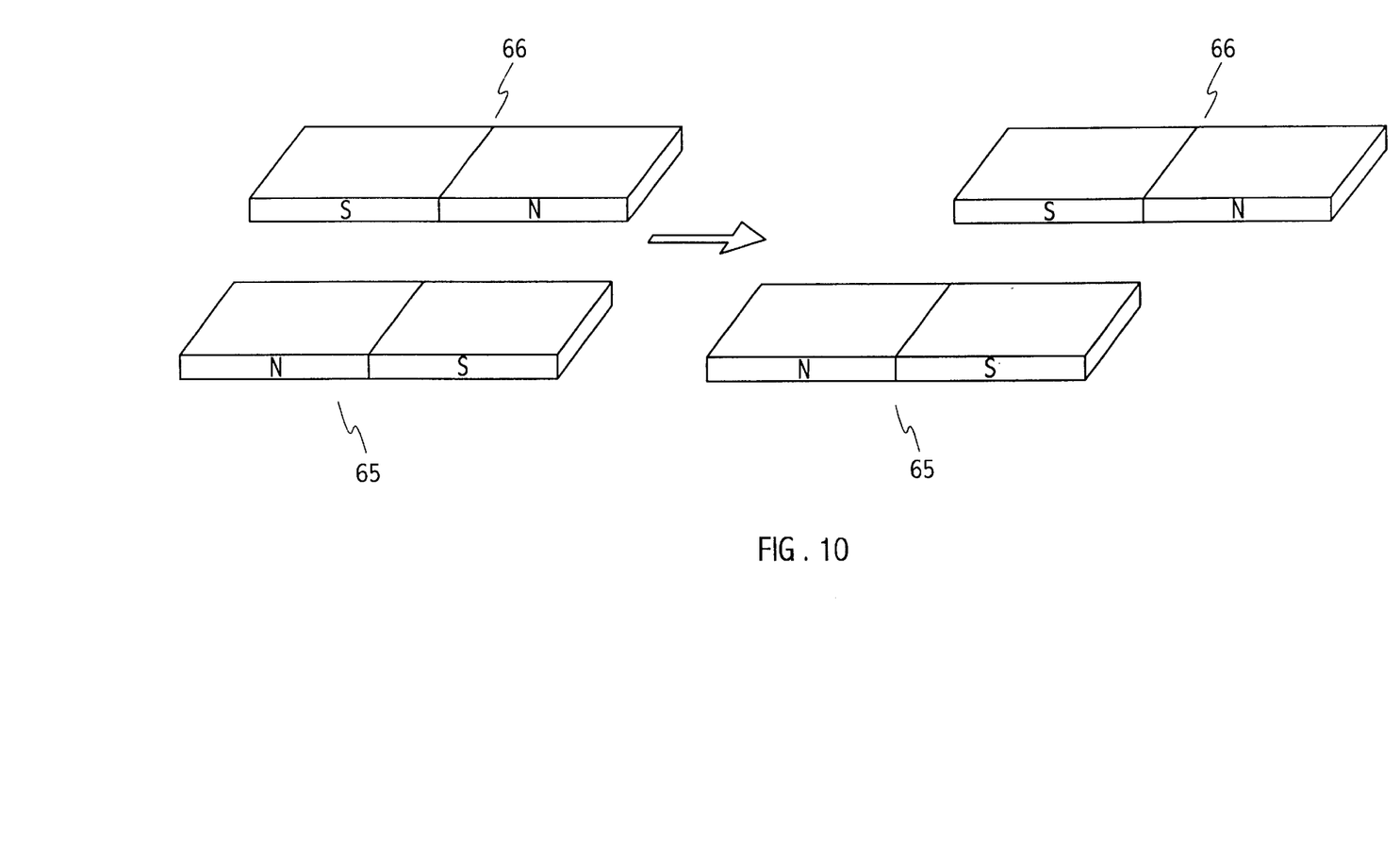
FIG. 10 is a simplified diagram of the movement between the fourth single layer magnetic member and the fifth single layer magnetic member of the magnetic closure apparatus parallel to lines Y1–Y2 in the FIG. 8 in accordance with the third preferred embodiment.

FIG. 10 is a simplified diagram of the movement between the second single layer magnetic member and the third single layer magnetic member of the magnetic closure apparatus parallel to lines Y1–Y2 in the FIG. 8. In FIG. 10, the fourth single layer magnetic member 65 is illustrated. The polarity of the fifth single layer magnetic member 66 magnetic field is the opposite of that for the fourth single layer magnetic member 65. As shown on the left of FIG. 4, the fourth single layer magnetic member 65 beneath, and the fifth single layer magnetic member 66 above, attract each other as a result of magnetic attraction, therefore the portable computer is in a closed position.

However, if users wish to disengage the closed position and direct the portable computer to an open position by moving the sliding member 68, which is linked to the fifth single layer magnetic member 66, a relative position displacement is created between the fifth single layer magnetic member 66 and the fourth single layer magnetic member 65. It follows that the magnetic force between the fifth single layer magnetic member 66 and the fourth single layer magnetic member 65 then transforms from attraction to repulsion as shown at the right of FIG. 4. Consequentially the portable computer is in an open position in brief, by moving the sliding member 68 and generating position displacement between the second housing member 22 and first housing member 61, users are able to determine whether the portable computer is in an open or closed position.

Although the invention has been described with a great degree of detail, it is to be understood that numerous changes can be made thereto without departing from the spirit and scope of the invention. The full scope of the present invention is to be limited only by the meaning and range of equivalency of the following claims.

What is claimed is:

1. A portable magnetic closure apparatus, comprising:
    a first housing member having a computer and a first single layer magnetic member;
    a second housing member;
    a sliding member slidable with respect to the second housing member;
    a magnetic apparatus with a dual layer magnetic member linked to the sliding member,
    wherein said sliding member is slidable from:
        a. a latching position in which a magnetic pole in said first single layer magnetic member faces an opposite-polarity magnetic pole in said dual layer magnetic member to cause attraction between said opposite-polarity magnetic poles and thereby latch said second housing member to said first housing member, to
        b. an unlatching position in which a magnetic pole in said first single layer magnetic member faces a like-polarity magnetic pole in said dual layer magnetic member to cause repulsion between said like-polarity magnetic poles and thereby facilitate unlatching of said first and second housing members.

2. The magnetic closure apparatus of claim 1, wherein the dual layer magnetic member is disposed on an inward edge on the second housing member.

3. The magnetic closure apparatus of claim 1, wherein the sliding member is disposed at an edge portion on the second housing member.

4. The magnetic closure apparatus of claim 1, wherein the first single magnetic member is disposed at an edge of the first housing member corresponding to the position of the dual layer magnetic member on the second housing member.

5. The magnetic closure apparatus of claim 1, wherein moving the sliding member enables the movement of the dual layer magnetic member, thereby allowing the closure and opening of the first housing member and second housing member via magnetic attraction and repulsion.

6. The magnetic closure apparatus of claim 1, wherein the polarity of the first single layer magnetic member magnetic field is the opposite of the polarity of the magnetic field of the bottom layer of the dual layer magnetic member.

7. The magnetic closure apparatus of claim 1, wherein the polarity of the magnetic field for the top and the bottom layer of the dual layer magnetic member are opposite to each other.

8. The magnetic closure apparatus of claim 1, wherein the second housing member is arranged to rotate about a 180-degree angle from a first position in which a display panel on the second housing member faces down to a second, reversed position in which the display panel on the second housing member faces up, wherein a first layer of said dual layer magnetic member faces said single layer magnetic member when said housing members are latched in said first position and a second layer of said dual layer magnetic member faces said single layer magnetic member when said housing members are latched in said second position.

9. The magnetic closure apparatus of claim 1, wherein the first single layer magnetic member is a single layer magnet and the dual layer magnetic member is a dual layer magnet.

10. The magnetic closure apparatus of claim wherein the second housing member further comprises a display.

11. The magnetic closure apparatus of claim 10, wherein the display further comprises a Liquid Crystal Display.

12. The magnetic closure apparatus of claim 10, wherein the display further comprises a Plasma Display Panel.

13. A portable magnetic closure apparatus, comprising:
 a first housing member having a computer and a first single layer magnetic member;
 a second housing member;
 a sliding member slidable with respect to the second housing member;
 a magnetic apparatus with a second single layer magnetic member linked to the sliding member,
 wherein said sliding member is slidable from:
  a. a latching position in which a magnetic pole in said first single layer magnetic member faces an opposite-polarity magnetic pole in said second single layer magnetic member to cause attraction between said opposite-polarity magnetic poles and thereby latch said second housing member to said first housing member, to
  b. an unlatching position in which a magnetic pole in said first single layer magnetic member faces a like-polarity magnetic pole in said second single layer magnetic member to cause repulsion between said like-polarity magnetic poles and thereby facilitate unlatching of said first and second housing members.

14. The magnetic closure apparatus of claim 13, wherein the second single layer magnetic member is disposed on an inward edge on the second housing member.

15. The magnetic closure apparatus of claim 13, wherein the sliding member is disposed at an edge portion on the second housing member.

16. The magnetic closure apparatus of claim 13, wherein the first single magnetic member is disposed at an edge of the first housing member corresponding to the position of the second single layer magnetic member on the second housing member.

17. The magnetic closure apparatus of claim 13, wherein moving the sliding member enables the movement of the second single layer magnetic member, thereby allowing the closure and opening of the first housing member and second housing member via magnetic attraction and repulsion.

18. The magnetic closure apparatus of claim 13, wherein the polarity of the magnetic field of the second single layer magnetic member is the opposite of the polarity of the magnetic field of the first single layer magnetic member.

19. The magnetic closure apparatus of claim 13 wherein, the first single layer magnetic member and the second single layer magnetic member are a single layer magnet.

20. The magnetic closure apparatus of claim 13, wherein the second housing member further comprises a display.

21. The magnetic closure apparatus of claim 20, wherein the display is a Liquid Crystal Display.

22. The magnetic closure apparatus of claim 20, wherein the display is a Plasma Display Panel.

* * * * *